United States Patent [19]
Yamamoto et al.

[11] Patent Number: 5,140,452
[45] Date of Patent: Aug. 18, 1992

[54] LONG-DISTANCE HIGH-SPEED OPTICAL COMMUNICATION SCHEME

[75] Inventors: Shu Yamamoto, Shiki; Hidenori Taga, Tokyo; Noboru Edagawa, Hirakata; Yoshihiro Yoshida, Omiya; Shiro Ryu, Niiza; Hiroharu Wakabayashi, Kawasaki, all of Japan

[73] Assignee: Kokusai Denshin Denwa Company, Ltd., Tokyo, Japan

[21] Appl. No.: 636,863

[22] Filed: Jan. 2, 1991

[30] Foreign Application Priority Data

Jan. 24, 1990 [JP] Japan ................................. 2-12703

[51] Int. Cl.$^5$ .................... H04B 10/02; H04B 10/00
[52] U.S. Cl. .................................. 359/154; 359/174; 385/24
[58] Field of Search .............. 455/610, 611, 612, 617; 350/96.13, 96.16; 359/124, 154, 173, 174, 179; 385/24

[56] References Cited

U.S. PATENT DOCUMENTS

| | | | |
|---|---|---|---|
| 4,889,404 | 12/1989 | Bhagavatula et al. | 455/610 |
| 4,928,316 | 5/1990 | Heritage et al. | 359/154 |
| 4,971,417 | 11/1990 | Krinsky et al. | 455/612 |
| 4,979,234 | 12/1990 | Agrawal et al. | 359/173 |
| 5,035,481 | 7/1991 | Mollenauer | 359/124 |

OTHER PUBLICATIONS

'904km, 1.2Gbit/s Non-Regenerative Optical Transmission Experiment Using 12 Er-Doped Fibre Amplifiers, ECOC '1989, PDA-3
Computer Simulation of Signal Transmission Characteristis in Optical Fiber Communication Systems Using LiNbO$_3$ Mach-Zehnder Modulator, "The Transactions of the IEICE", vol. E 73, No. 4, Apr. 1990
Frequency Chirping in External Modulators, "Journal of Lightwave Technology", vol. 6, No. 1, Jan. 1988

*Primary Examiner*—Edward L. Coles, Sr.
*Assistant Examiner*—Kinife-Michael Negash
*Attorney, Agent, or Firm*—Jordan and Hamburg

[57] ABSTRACT

In a long-distance high-speed optical communication scheme in which multiple optical amplifiers are provided at a large number of stages in optical fibers, an optical signal from a light source which has a desired small line width and oscillates at a single wavelength is modulated at a high speed by an external modulator and then transmitted in the fibers which are dispersion shifted optical fibers, the zero-dispersion wavelength in which is set to be larger than the oscillation wavelength of the light source. Therefore, noises and the modulation instability, which would occur due to the phase fluctuation in the oscillation wavelength of the light source, and the influence of a waveform distortion due to the dispersion in the optical fibers can be avoided to make it possible for the first time in history to transmit the optical signals at the high-speed in the long-distance optical communication system employing the optical amplifiers.

7 Claims, 6 Drawing Sheets

LONG-DISTANCE HIGH-SPEED OPTICAL COMMUNICATION SCHEME

BACKGROUND OF THE INVENTION

The present invention relates to a long-distance optical communication system employing multiple optical amplifiers, and more particularly relates to a long-distance high-speed optical communication scheme in which an optical signal can be transmitted at a high speed.

Since an optical amplifier such as a semiconductor laser amplifier, which directly amplifies an optical signal as it is in the form of light, is simple in constitution and does not have restrictions on the speed of transmission, there is an advantage that a very-efficient long-distance optical communication system can be constituted by combining the optical amplifier with a single-mode optical fiber.

Figure 10:
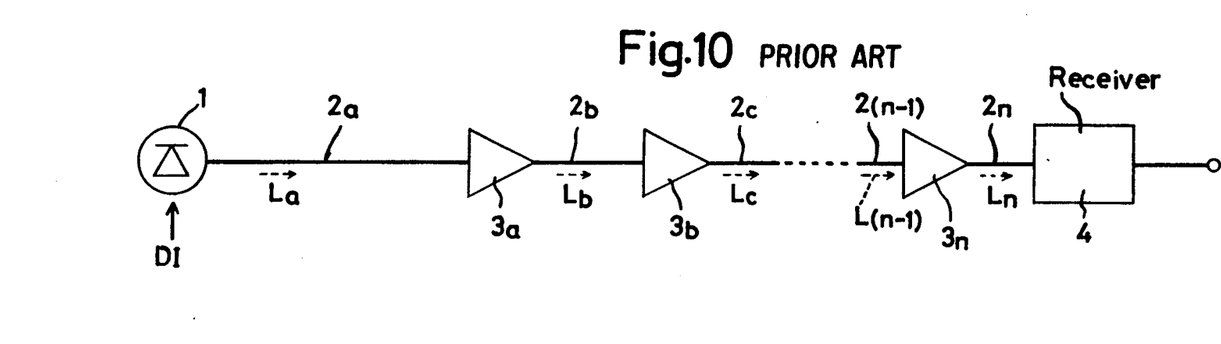
FIG. 10 is a block diagram of a conventional optical amplification communication scheme.

FIG. 10 is a block diagram of a (conventional) long-distance optical communication system employing a large number of optical amplifiers. Shown in FIG. 10 are a light source 1 such as a semiconductor laser, optical fibers $2a$, $2b$, ... and $2n$ for transmitting optical signals La, Lb, ... and Ln, the optical amplifiers $3a$, $3b$, ... and $3n$ for directly amplifying the optical signals La, Lb, ... and $L_{(n-1)}$, and a receiver 4 which demodulates the optical signal Ln. Digitally communicated information DI is converted into the optical signal La by the light source 1. The optical signal La is sent into the optical fiber $2a$. The optical signals La, Lb, ... and $L_{(n-1)}$ attenuated while being transmitted through the optical fibers $2a$, $2b$, ... and $2_{(n-1)}$ are amplified by the optical amplifiers $3a$, $3b$, ... and $3n$ provided at the large number of stages with nearly the same interval between the optical fibers $2a$, $2b$, ... and $2n$, so that the digitally communicated information DI arrives at the receiver 4 through a multiple repeaters. The digitally communicated information DI is thus transmitted through the communication system. As shown in literature such as "904 km 1.2 Gbps Non-regenerative Optical Transmission Experiment Using 12 Er-doped Fiber Amplifiers" by N. Edagawa et al., PDA-8, ECOC89", it has already been confirmed experimentally that it is basically possible to transmit a high-speed signal in such a transmission scheme.

Studies have been intensively made in order to transmit an optical signal at a high speed through a long-distance optical communication system employing optical amplifiers. As a result, various proposals have been made. For example, it has been proposed that the wavelength of an optical signal is set at 1.55 $\mu$m at which the loss of a silica-based optical fiber is minimum, and the fiber is modified as a dispersion shifted optical fiber to avoid a dispersion which would be a problem in transmitting a high-speed signal. However, a long-distance optical communication system having a transmission speed of 1.2 gigabits and a transmission length of about 1,000 km and according to a conventional long-distance optical communication method employing optical amplifiers has been only reported to be the longest-distance optical communication system. That system is far insufficient to be a transoceanic optical communication system of about 10,000 km in length. Accordingly, a long-distance high-speed optical communication in which an optical signal expected to be transmitted at a higher speed in the future can be transmitted at that speed through a long-distance optical communication system employing optical amplifiers has been strongly desired, but not disclosed.

SUMMARY OF THE INVENTION

The present invention was made in consideration of the above-described problem of a conventional art. Accordingly, it is an object of the present invention to provide a long-distance high-speed optical communication in which an optical signal can be transmitted at a high speed through a long-distance optical communication system employing optical amplifiers.

The long-distance high-speed optical communication system has features which are described from now on. The system, in which the optical signal is transmitted at the high speed through which the long-distance optical communication system in which the optical amplifiers are provided at a large number of stages of an optical fiber, has the first feature that the optical signal from a light source which has a desired small spectrum width and oscillates at a single wavelength is modulated at a high speed by an external modulator and then transmitted in the optical fiber which is a dispersion shifted optical fiber, the zero-dispersion wavelength in which is set to be larger than the oscillation wave-length of the light source. The method has the second feature that the external modulator having a positive alpha parameter indicative of the change in the phase of light performs the amplitude modulation of the optical signal.

Figure 2:
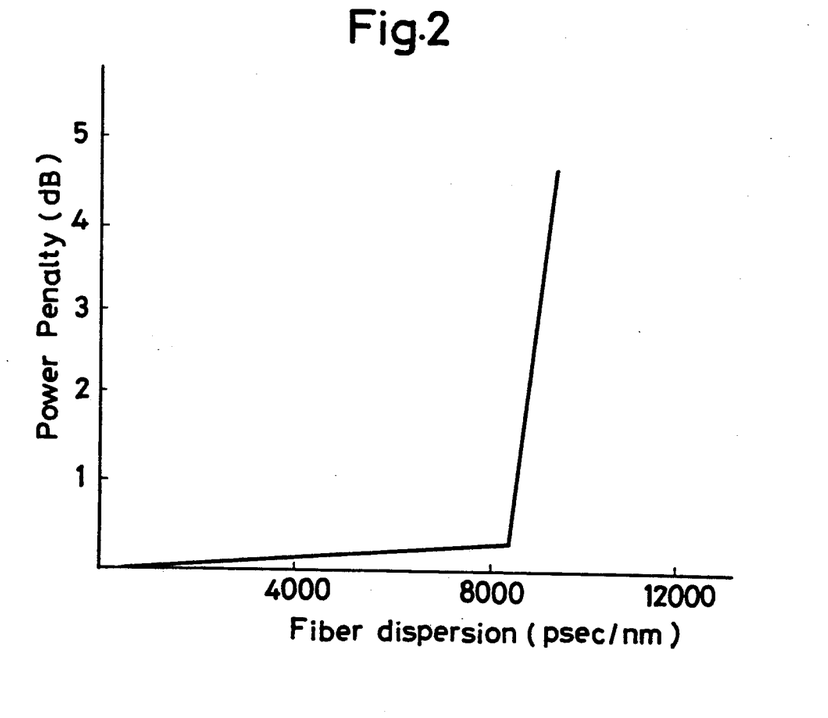
FIG. 2 is a characteristic graph of the dispersion in a fiber and power penalty, which is for explaining the principle of the present invention.
Figure 3:
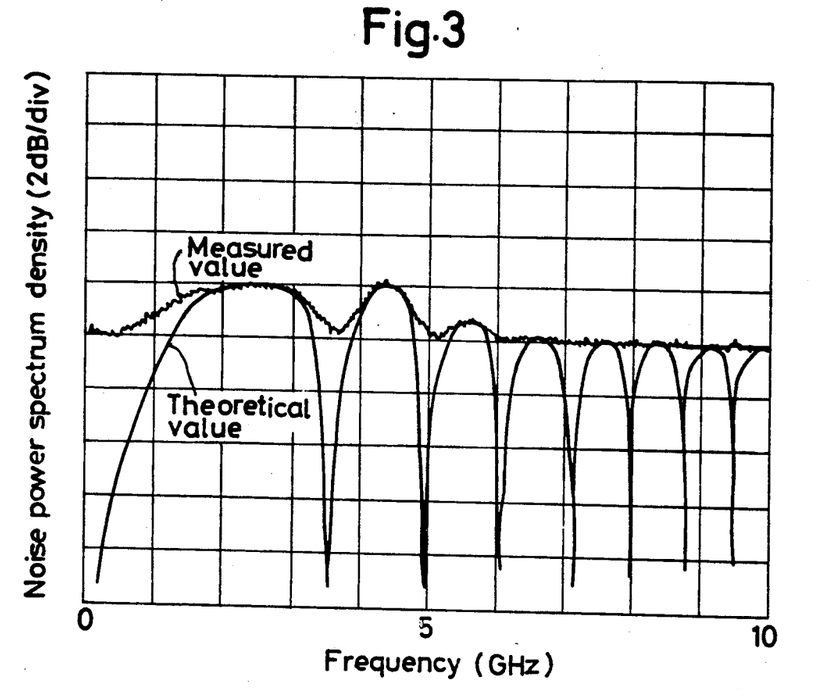
FIG. 3 is a characteristic graph of experimental and theoretical results about frequency and noise power spectrum density, which are based on the present invention.

A principle and operation which lead to the features are described from now on. The reason why an optical signal cannot be transmitted at a high speed in a long-distance optical communication system employing optical amplifiers has been considered to be that noises made by the optical amplifiers and transmission characteristic degradation factors such as the dispersion in the optical fiber accumulate in the system along the length thereof. However, when the present inventor et al. experimented on the transmission of a high-speed signal of 2.4 gigabits, they found out that the transmission characteristics of the signal degraded significantly when the dispersion in an optical fiber exceeded a prescribed value. FIG. 2 shows the result of the experiment, which is the correlation between the value of the dispersion and the degradation of the transmission characteristics. It is understood from FIG. 2 that the degradation of the transmission characteristics increases significantly (abruptly) when the value of the dispersion slightly exceeds 8,000 psec. The degradation of the transmission characteristics shown in FIG. 2 is characterized in that the value of the dispersion at which the degradation begins is small and the increase in the degradation at the value of the dispersion, which is slightly more than 8,000 psec, is sharp, as differs from the conventionally known degradation of transmission characteristics. The present inventor et al. then made the analysis of the noise in the received signal and a theoretical analysis with a computer. FIG. 3 shows the results of the analyses, which are the frequency characteristic of the observed noise and the result of a calculation based on inference and coincide well with each other. From these results, it turned out that when a signal is transmitted at a high speed in an optical fiber in which large dispersion takes place, the small phase fluctuation of the oscillation wavelength of a light source is converted into an amplitude component and becomes a new noise in the optical fiber. It has been well known that the transmission characteristics degrade if the value of dispersion is increased. The cause of the degradation has been considered to be that the waveform of the transmitted signal is distorted due to the increase in the dispersion in the fiber. The present inventor et al. think that the degradation of the transmission characteristics in the transmission of the signal at the high speed is caused not only by the increase in the dispersion in the fiber but also by the small phase fluctuation of the oscillation wavelenght. As a result, according to the present invention, the spectrum width of the light source which oscillates to generate the optical signal is made extremely small in order to minimize the phase fluctuation.

As pointed out so far, the distortion of waveform due to the dispersion is a problem in achieving a long-distance optical communication system. As already known, reducing the dispersion in the fiber or reducing the change in wavelength of light at the time of rising and falling of the waveform of light pulse is an effective means for solving the problem. The allowable quantity of the change in the wavelength of light depends on the total quantity of the dispersion in the optical fiber for the transmission of the optical signal and on the bit rate thereof.

Figure 4:
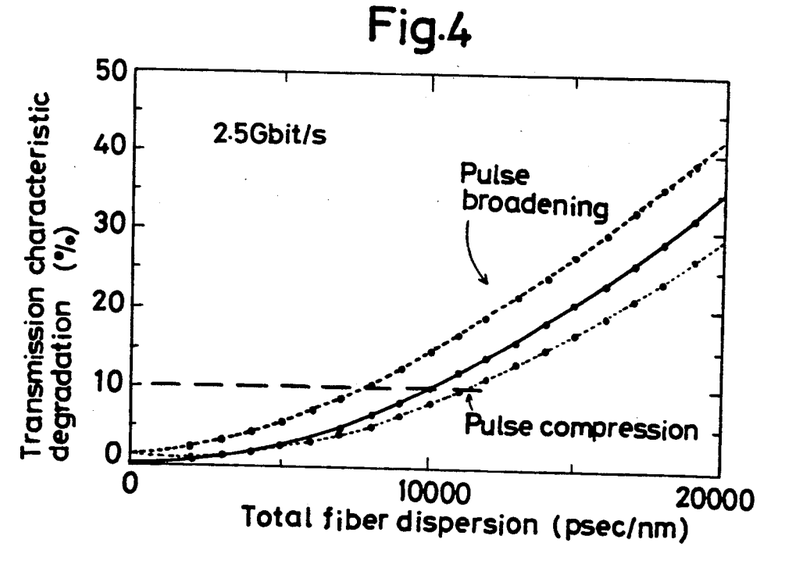
FIG. 4 is a characteristic graph of transmission characteristic degradation due to waveform distortion, which is based on the present invention.

FIG. 4 shows the relationship between the total dispersion in the optical fiber and the degradation of the transmission characteristics in order to explain the relationship between the speed of transmission and the allowable quantity of the dispersion in the use of a LiNbO$_3$ Machzender external modulator. In FIG. 4, the degradation of the transmission characteristics is indicated by that of received eye diagram, at the quantity of which eye closes. If the degradation is up to about 10 percent, good transmission can be normally performed. Generally speaking, from a viewpoint of the production yield of the optical fiber, the practical value of the dispersion for 1 km is 1 psec/nm or more. Making the value of the dispersion extremely small for a transoceanic communication system is not preferable, because it leads to the increase in cost.

Since the wavelength of a transmitted signal in a conventional transmission system is larger than the zero-dispersion wavelength in an optical fiber and the wavelength of the signal from an external modulator decreases at the time of the rising of the pulse of the signal, the width of the pulse decreases at the time of the transmission of the optical signal in the optical fiber. That state of the transmission is called pulse compression. The optical signal can be transmitted in the optical fiber even if the speed of the transmission is 2.5 Gbit/s (gigabits-per-second) at the total fiber dispersion of 10,000 psec and the length of the fiber is about 10,000 km, as shown in FIG. 4.

Figure 5:
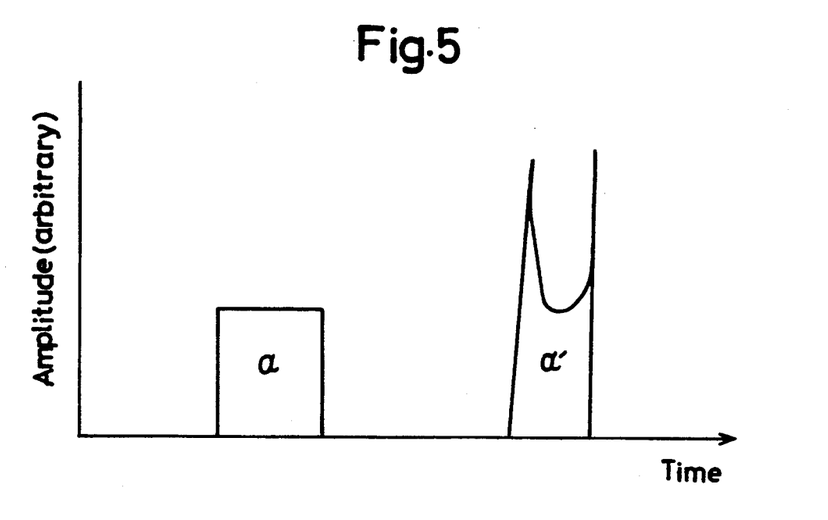
FIG. 5 is a characteristic graph of waveform distortion due to modulation instability, which is based on the present invention.

The other distortion of the optical pulse signal results from a modulation instability which occurs when the optical signal has high power and is transmitted in the optical fiber. FIG. 5 is an amplitude graph for explaining the principle of the present invention. As shown in FIG. 5, the waveform $\alpha$ of the pulse not yet transmitted and that $\alpha'$ of the pulse already transmitted differ from each other greatly. The high-frequency component of the pulse waveform $\alpha'$ is an emphasized distortion in the transmission. According to the present invention, the dispersion in the optical fiber is made negative, namely, the wavelength of the optical signal is set to be smaller than the zero-dispersion wavelength in the optical fiber, in order to avoid the modulation instability to reduce the distortion of the waveform of the optical pulse signal. In that case, the pulse width of the signal is expanded due to the dispersion in the fiber, conversely to the pulse compression mentioned above, and the length of the fiber through which the signal can be transmitted decreases as shown in FIG. 4.

As described above, according to the present invention, not only the conventional countermeasures against the waveform distortion but also those against the phase fluctuation are taken to prevent the distortion of the pulse waveform.

DETAILED DESCRIPTION OF EXEMPLARY EMBODIMENTS

Figure 1:
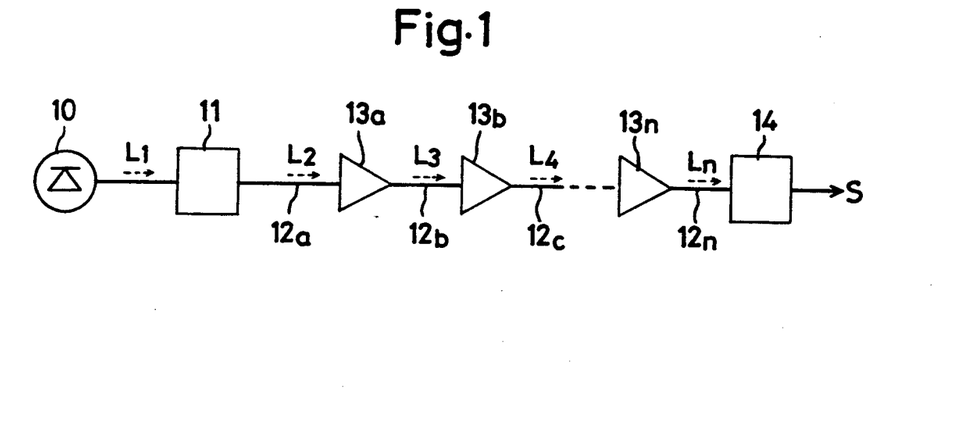
FIG. 1 is a block diagram of a long-distance high-speed optical communication scheme which is an embodiment of the present invention.

FIG. 1 is a block diagram of a long-distance high-speed optical communication scheme which is an embodiment of the present invention. The difference of the method from the conventional method shown in FIG. 10 is that a light source 10 whose oscillation wavelength is set to be smaller than that of the zero-dispersion wavelength in optical fibers 12a, 12b, . . . and 12n for transmission (in other words, the zero-dispersion wavelength in the optical fibers is set to be larger than the oscillation wavelength of the light source) and which is sufficiently small in the phase fluctuation in the oscillation wavelength thereof is adopted, an external modulator 11 which is made of LiNbO$_3$ and converts the output L1 from the light source 10 into a pulse signal L2 is employed, and an alpha parameter is the ratio of the change in the wavelength of the pulse signal L2 at the time of the generation thereof is set to be positive or the wavelength of the output signal is shifted to be larger at the rising of the pulse. Optical amplifiers 13a, 13b, . . . and 13n are provided at a large number of stages with nearly the same interval between the optical fibers 12a, 12b, ... and 12n, and have the same constitution as the conventional system. A receiver 14 converts a transmitted optical signal Ln into an electric signal S, and has the same constitution as the conventional system.

Figure 6:
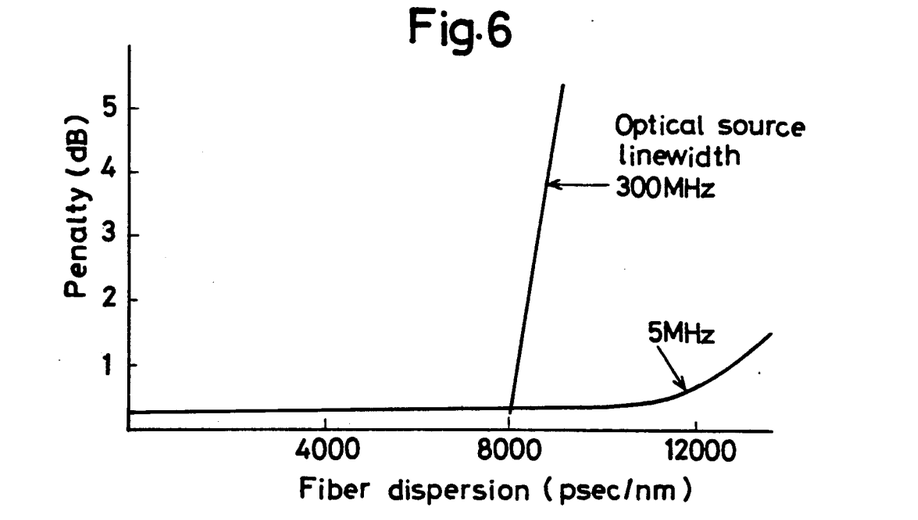
FIG. 6 is a comparative graph of a light source line width according to the present invention and a light source line width according to a conventional art.
Figure 7:
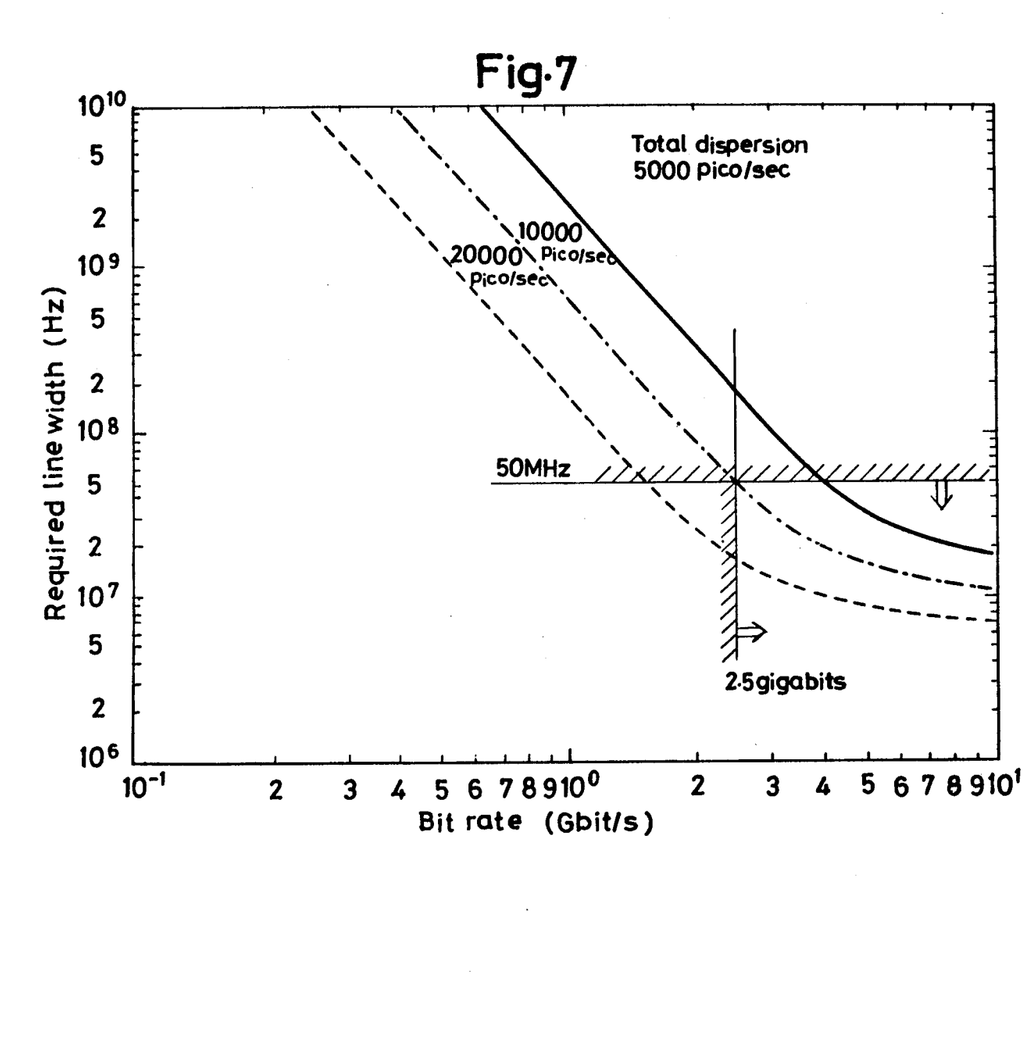
FIG. 7 shows the calculated values of a required light source line width, which are based on an experimental result obtained in accordance with the present invention.

FIG. 6 shows the result of the comparison of the characteristics of the light source 10 whose phase fluctuation in the oscillation wavelength thereof is sufficiently small or 5 MHz, with those of the above-mentioned single-mode laser light source 1 which is used for conventional optical communication and whose phase fluctuation in the oscillation wavelength thereof is 300 MHz, with regard to the degradation in reception at the dispersion values of the transmission optical fibers 12a, 12b, ... and 12n and 2a, 2b, ... and 2n. It is understood from FIG. 6 that the degradation abruptly occurs at about 8,000 psec/nm with regard to the conventional light source 1 large in the phase fluctuation in the oscillation wavelength thereof, but little degradation occurs with regard to the light source 10 of 5 MHz in the phase fluctuation in the oscillation wavelength thereof so that good transmission can be performed up to about 12,000 psec/nm at which a waveform degradation occurs due to dispersion. The required phase fluctuation in the oscillation wavelength of the light source 10 depends on the speed of the transmission and the length of the optical fiber. As shown by the results of an experiment and those of a theoretical calculation in FIG. 7, the line width of the light source 10, which is the phase fluctuation in the oscillation wavelength of the light source, is required to be 50 MHz or less when the speed of the transmission in a system to which the method which is the embodiment is applied is 2.4 Gbit/s to 4.8 Gbit/s and the dispersion in the optical fibers is 5,000 psec/nm or more. The line width of the light source 10 should preferably be 20 MHz to 10 MHz or less if the degradation is to be reduced in consideration of a transmission line of high quality. To meet such a condition, a conventional single-mode laser diode is insufficient as the light source 10. A single-mode laser diode of cavity length particularly designed to be large, a laser diode provided with an external resonator, and a multilayer-quantum-well laser diode is sufficient as the light source 10 to meet the condition.

The zero-dispersion wavelength in each of the optical fibers 12a, 12b, ... and 12n is set to be larger than the oscillation wavelength of the light source 10 in order to cope with a waveform distortion due to the instability of modulation. In that case, the difference between the zero-dispersion wavelength in each of the optical fibers 12a, 12b, ... and 12n and the oscillation wavelength of the light source 10 depends on the speed of the transmission and the length of the transmission line of the system. When the transmission is performed at the speed of 2.4 gigabits through the length of 10,000 km, the wavelength difference needs to be 10 nm to 30 nm in consideration of the application of a dispersion shifted optical fiber.

Countermeasures against the phase fluctuation as well as the pulse waveform distortion are thus taken in the embodiment so as to substantially enable long-distance high-speed optical communication employing the optical amplifiers 13a, 13b, ... and 13n at the large number of stages.

Figure 8:
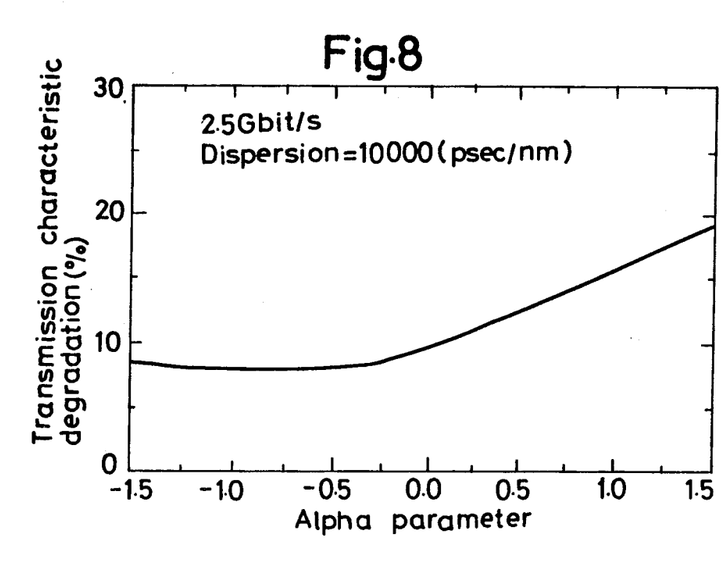
FIG. 8 shows the required values of the alpha parameter of a modulator.
Figure 9A:
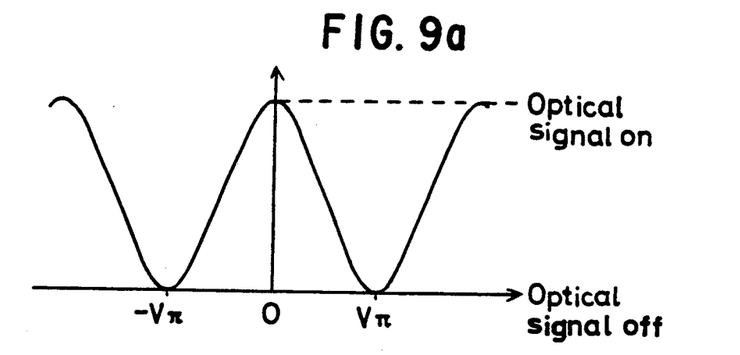
FIG. 9(a) is a charac-teristic graph of an external modulator.
Figure 9B:
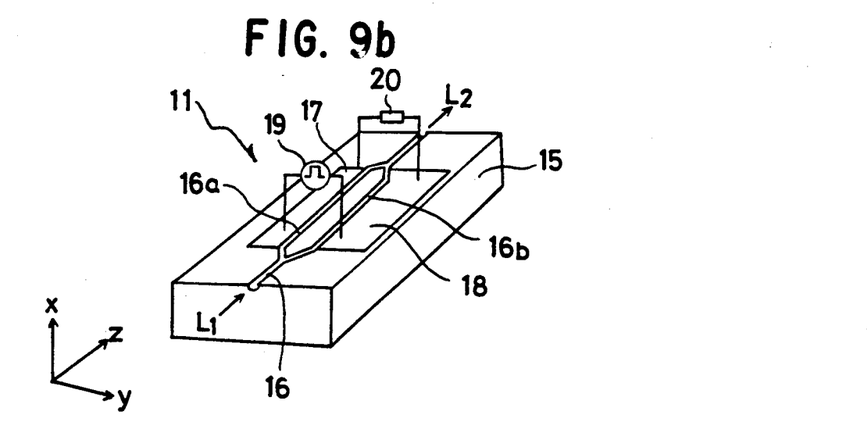
FIG. 9(b) is a perspective view of the external modulator.
Figure 9C:
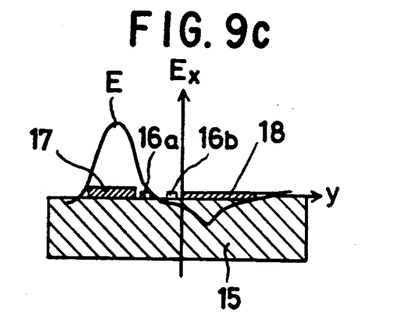
FIGS. 9(c) and 9(d) are operation cross section views of the external modulator.
Figure 9D:
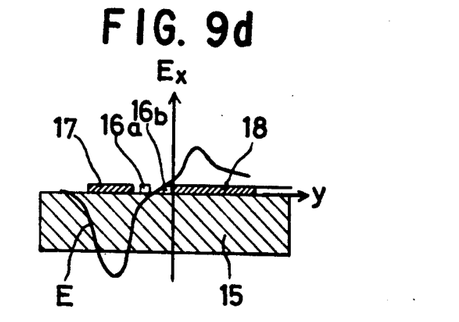

A method which is another embodiment of the present invention and in which a waveform distortion due to an optical fiber dispersion is prevented is described from now on. FIG. 8 shows the magnitude of a transmission characteristic degradation at the change in the alpha parameter of the external modulator 11 for the method. The magnitude of the transmission characteristic degradation is indicated by the quantity of eye degradation in FIG. 8. The total dispersion quantity of the optical fibers 12a, 12b, ... and 12n is set to be negative in order to prevent the instability of modulation, and is −10,000 psec to −20,000 psec. Although FIG. 8 shows the magnitude of the degradation at the total dispersion quantity which is positive, the quantity becomes negative if the wavelength of the light source 10 is set to be smaller than the zero-dispersion value of each of the optical fibers 12a, 12b, ... and 12n. For that reason, good transmission is enabled if the alpha parameter is inverted in polarity so as to be set at +0.5 to +1.5.

A procedure of operating the external modulator 11 at such a negative alpha parameter is briefly described from now on. Shown at (a) in FIG. 9 is the optical output from the external modulator 11 with an applied voltage in the operation of the modulator in the procedure. When the applied voltage is either +V or −V, the light does not pass through the modulator 11. Shown at (b) in FIG. 9 is an example of the constitution of the modulator 11, in which the input optical signal L1 introduced into a light conduction path 16 on a substrate 15 of an LiNbO$_3$ crystal is divided halfway, an electric field E is applied to division paths 16a and 16b with electrodes 17 and 18 by a modulation pulse voltage power supply 19 to change the propagation phase of the input light signal, and the signals in the division paths are synthesized with each other on the output side of the modulator so that the output optical signal L2 is sent out or not. Shown at 20 in FIG. 9 is a load resistor. Shown at (c) in FIG. 9 is the distribution of the electric field E at the time of the application of the voltage of +V. Shown at (d) in FIG. 9 is the distribution of the electric field E at the time of the application of the voltage of −V. The change in the wavelength of the signal at the time of the rising thereof takes place because of the fact that a slight difference is made between the phases in the division paths 16a and 16b due to the difference between the portions of the electric field E applied to the division paths. Since the distribution of the electric field E applied to both the division paths 16a and 16b is inverted due to the polarity of the applied voltage as understood from (c) and (d) in FIG. 9, the external modulator 11 originally having a negative alpha parameter can be used as one having a positive alpha parameter.

Thus, the optical signal from the light source which has a desired small line width and oscillates at a single wavelength is modulated at a high speed by the external modulator, and then transmitted through the optical fibers, the zero-dispersion wavelengths in which are subjected to dispersion shift so as to be larger than the oscillation wavelength of the light source. For that reason, the optical signal can be transmitted at a high speed in the long-distance optical communication system employing the optical amplifiers.

The phase fluctuation in the oscillation wavelength of the light source can be reduced by causing the light source to oscillate at a line width of 50 MHz or less to generate the optical signal.

The distortion of the waveform of the optical signal due to the dispersion in the optical fibers can be reduced by modulating the optical signal with the external modulator which performs amplitude modulation and whose alpha parameter indicative of the change in the optical phase under the electric field is positive. The degradation of transmission characteristics can be diminished by setting the alpha parameter at +0.5 to +1.5.

Consequently, noises and the modulation instability, which would occur due to the phase fluctuation in the oscillation wavelength of the light source, and the influence of a waveform distortion due to the dispersion in the optical fibers can be avoided to make it possible for the first time in history to transmit the optical signal at the high speed in the long-distance optical communication system employing the optical amplifiers. Therefore, the present invention can be expected to be applied to an optical amplification repeater system, particularly a long-distance submarine optical fiber cable communication method or the like.

What is claimed is:

1. In a long distance high-speed optical communication method in which an optical signal is transmitted at a high speed from a source in a long distance optical communication system via an optical fiber in which a plurality of optical amplifiers are provided at intervals along the optical fiber, the improvement comprising applying light from said source to said fiber with a line width of 50 MHz or less and at a single wavelength, modulating the light from the source at a high speed with an external modulator and then transmitting the modulated light in said fiber, said fiber being a dispersion shifted optical fiber, the zero-dispersion wavelength of said fiber being selected to be larger than the oscillation wavelength of said light source.

2. A long distance high-speed optical communication method according to the claim 1, wherein said step of modulating comprises modulating in an external modulator having a positive parameter indicative of the change in the phase of light for pulse amplitude modulating the optical signal.

3. A long-distance high-speed optical communication method according to claim 2, wherein the value of the positive parameter indicative of the change in the phase of light is +0.5 to +0.5.

4. A long distance high-speed optical communication system comprising a light source for oscillating an optical signal which has a small line width at a single wavelength;

an external modulator positioned to pulse amplitude modulate said optical oscillating signal from said light source;

dispersion shifted optical fibers positioned to transmit said optical signal modulated by said external modulator to a destination, the zero-dispersion wavelength of said dispersion shifted optical fibers being selected to be larger than the oscillation wavelength of said light source; and optical amplifiers distributed along said dispersion shifted optical fibers for amplifying said optical signal transmitted.

5. A long distance high-speed optical communication system according to claim 4 in which said light source comprises a source for oscillating the optical signal with a line width of 50 MHz or less at a single wavelength.

6. A long distance high-speed optical communication system according to claim 4, in which said external modulator has a positive alpha parameter, wherein said alpha parameter is the ratio of change in a wavelength of a pulse signal of said light source.

7. A long distance high-speed optical communication system according to claim 6, in which said positive alpha parameter is +0.5 to +1.5.

* * * * *